(12) United States Patent
Wakumoto et al.

(10) Patent No.: US 7,706,411 B2
(45) Date of Patent: Apr. 27, 2010

(54) HANDLING OVERSUBSCRIBED MESH PORTS WITH RE-TAGGING

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1632 days.

(21) Appl. No.: 10/812,368

(22) Filed: Mar. 29, 2004

(65) Prior Publication Data

US 2005/0213506 A1 Sep. 29, 2005

(51) Int. Cl.
*H04J 3/24* (2006.01)
*G06F 11/00* (2006.01)
*H04L 12/56* (2006.01)

(52) U.S. Cl. .................. 370/475; 370/237; 370/389
(58) Field of Classification Search .......... 370/235, 370/229, 395.3, 400, 465, 471, 475, 237
See application file for complete search history.

(56) References Cited

U.S. PATENT DOCUMENTS

| | | | |
|---|---|---|---|
| 5,588,000 A * | 12/1996 | Rickard | 370/428 |
| 6,493,318 B1 | 12/2002 | Bare | |
| 6,577,600 B1 | 6/2003 | Bare | |
| 6,580,715 B1 | 6/2003 | Bare | |
| 6,813,242 B1 * | 11/2004 | Haskin et al. | 370/229 |
| 6,831,895 B1 * | 12/2004 | Ji et al. | 370/237 |
| 7,092,387 B2 * | 8/2006 | Chen et al. | 370/360 |
| 7,167,443 B1 * | 1/2007 | Dantu et al. | 370/218 |
| 7,209,440 B1 * | 4/2007 | Walsh et al. | 370/230 |
| 7,315,510 B1 * | 1/2008 | Owens et al. | 370/218 |
| 2002/0009050 A1 * | 1/2002 | Ueno | 370/230 |
| 2002/0089934 A1 * | 7/2002 | Sokhin et al. | 370/237 |
| 2002/0181395 A1 * | 12/2002 | Foster et al. | 370/229 |
| 2002/0186658 A1 * | 12/2002 | Chiu et al. | 370/237 |
| 2003/0165137 A1 * | 9/2003 | Soloway et al. | 370/389 |
| 2004/0196787 A1 * | 10/2004 | Wang et al. | 370/229 |
| 2004/0213228 A1 * | 10/2004 | Tingle et al. | 370/389 |
| 2005/0117512 A1 * | 6/2005 | Vasseur et al. | 370/229 |
| 2005/0195845 A1 * | 9/2005 | Mayhew et al. | 370/412 |
| 2009/0303882 A1 * | 12/2009 | Tanaka et al. | 370/237 |

* cited by examiner

*Primary Examiner*—Chi H Pham
*Assistant Examiner*—Warner Wong

(57) ABSTRACT

One embodiment disclosed relates to a method of handling oversubscribed ports between switches. An oversubscribed port is detected at a detecting switch. A set of paths exiting at the oversubscribed port is selected for retagging, and tags for the set of paths are invalidated. When packets with the invalidated tags are received, the received packets are retagged with a tag associated with a detour path. Another embodiment disclosed relates to a packet switch apparatus with oversubscribed port handling capability for use in a switching mesh. Another embodiment disclosed relates to a switching mesh including a capability to handle oversubscribed ports between switches.

22 Claims, 9 Drawing Sheets

HANDLING OVERSUBSCRIBED MESH PORTS WITH RE-TAGGING

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch (es)).

Network switch devices and protocols associated therewith are also used to manage redundant paths between network devices. Where there is but a single path connecting two network-devices, that single path, including all intermediate devices between the source and destination devices, represent a single point of failure in network communications between that source and destination device. It is therefore common in network computing environments to utilize a plurality of redundant paths to enhance reliability of the network. Having multiple paths between two devices enhances reliability of network communication between the devices by allowing for a redundant (backup) network path to be used between two devices when a primary path fails.

SUMMARY

One embodiment of the invention relates to a method of handling oversubscribed ports between switches. An oversubscribed port is detected at a detecting switch. A set of paths exiting at the oversubscribed port is selected for retagging, and tags for the set of paths are invalidated. When packets with the invalidated tags are received, the received packets are retagged with a tag associated with a detour path.

Another embodiment disclosed relates to a packet switch apparatus with oversubscribed port handling capability for use in a switching mesh. The apparatus includes at least a plurality of ports and a switch controller coupled to the plurality of ports. The switch controller is configured using procedures stored in memory to (a) detect an oversubscribed port, (b) select a set of paths exiting at the oversubscribed port for retagging, (c) invalidate tags for the set of paths, (d) receive packets with the invalidated tags, and (e) retag the received packets with a tag associated with a detour path.

Another embodiment disclosed relates to a switching mesh including a capability to handle oversubscribed ports between switches. Each switch in the mesh is configured to detect an oversubscribed port, select a set of paths exiting at the oversubscribed port for retagging, invalidate tags for the set of paths, receive packets with the invalidated tags, and retag the received packets with a tag associated with a detour path.

DETAILED DESCRIPTION

A. Prior Handling of Over-Subscribed Mesh Ports

Figure 1:
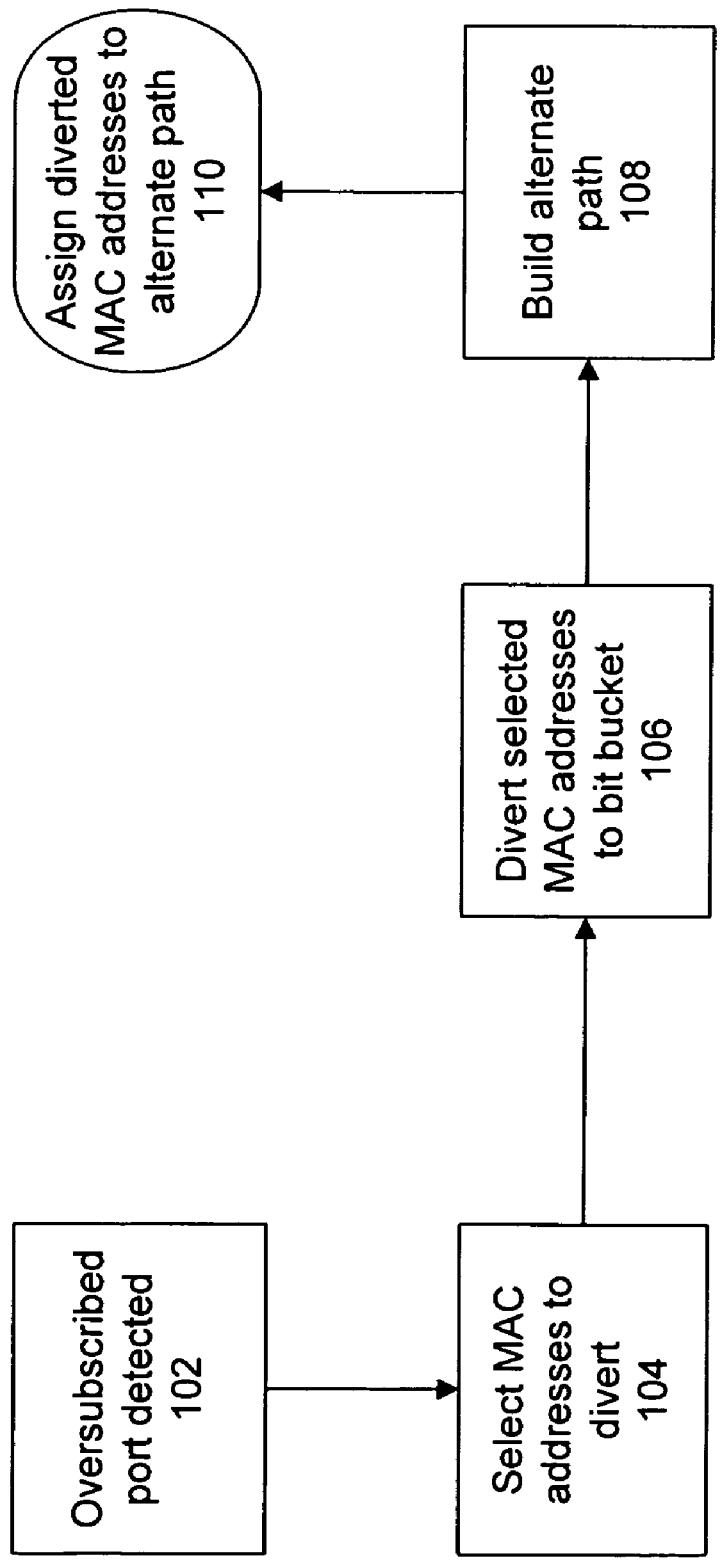
FIG. 1 is a flow chart depicting a prior method of handling oversubscribed ports.

FIG. 1 is a flow chart depicting a prior method 100 of handling oversubscribed ports. In this prior method, oversubscribed mesh ports (mesh ports that are dropping packets) are handled in a similar way as link failures. An oversubscribed mesh port is handled differently in that only a portion of the MAC addresses associated with the link are moved to a newly built path. However, much like a link failure, these MAC addresses are temporarily put into a bit bucket state, such that packets destined to these MAC addresses will be dropped, in hardware circuitry, by the switch currently moving these addresses. The procedure of moving MAC addresses to a newly built path is a slow and drawn out process that can take several seconds to complete in some implementations. There may be a large amount of packet loss during this period of time.

Figure 2:
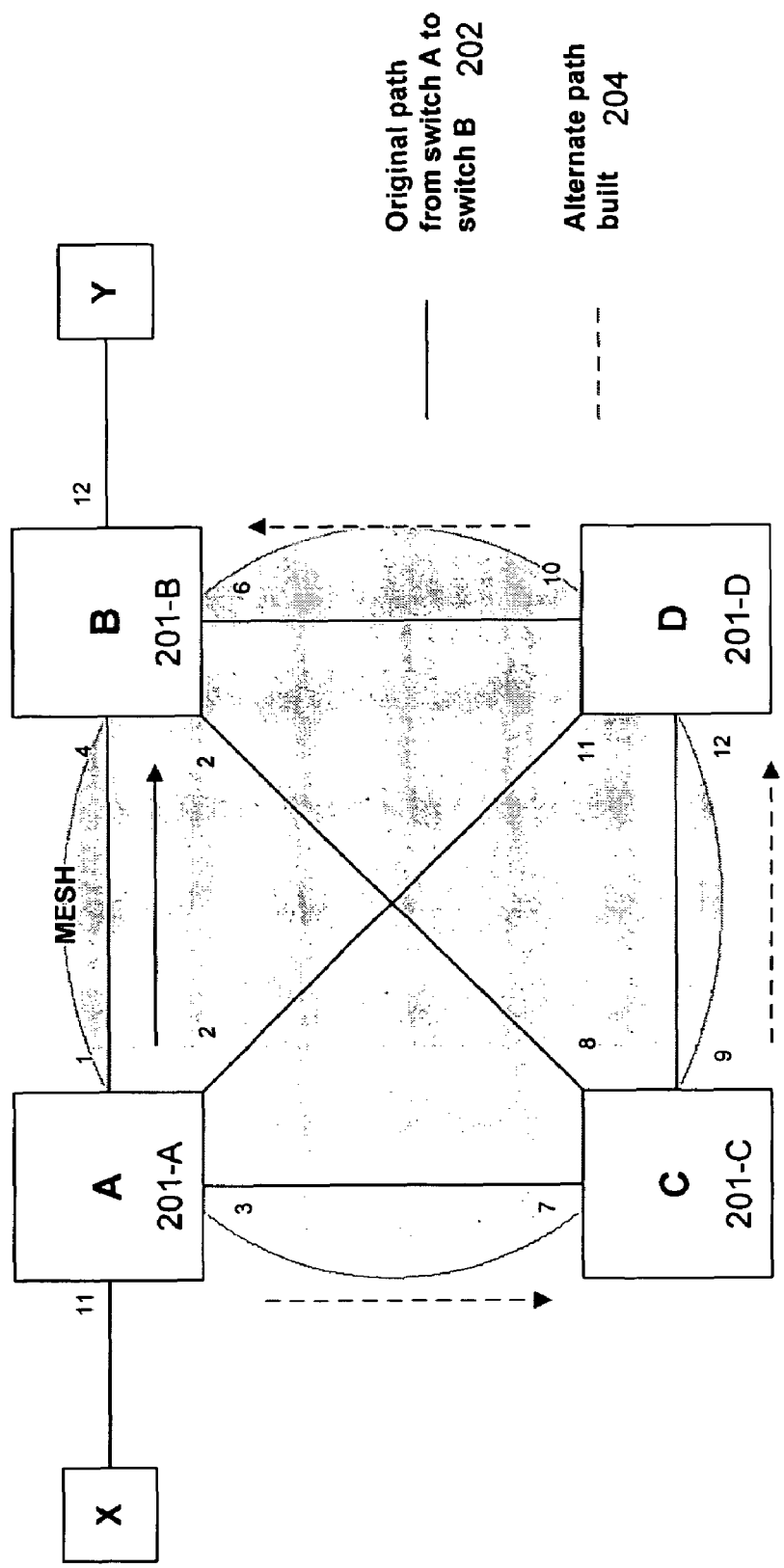
FIG. 2 is a schematic diagram of a switching mesh used in discussing the prior method.

For purposes of illustration, consider the diagram of a switching mesh in FIG. 2. Let us say that host X is communicating with host Y. Switch A 201-A has assigned the path 202 from host X to host Y to traverse across the direct link that connects switch A, port 1 to switch B, port 4. If switch A detects 102 that its port 1 is oversubscribed, then switch A 201-A selects 104 some of the MAC addresses to be moved to an alternate path 204 (which is yet to be built) so as to alleviate the oversubscription of port 1. In this instance, consider that switch A 201-A selects 104 the MAC address for host Y (MAC address Y), which is owned by switch B, to be moved to the alternate path 204. Switch A then diverts 106 packets destined for the selected MAC address(es) (e.g., MAC address Y) to a "bit bucket". In other words, the packets destined for MAC address Y are (temporarily) dropped. Switch A then builds 108 an alternate path 204 to switch B and assigns 110 the diverted MAC addresses (e.g., MAC address Y) to the alternate path 204.

Figure 3:
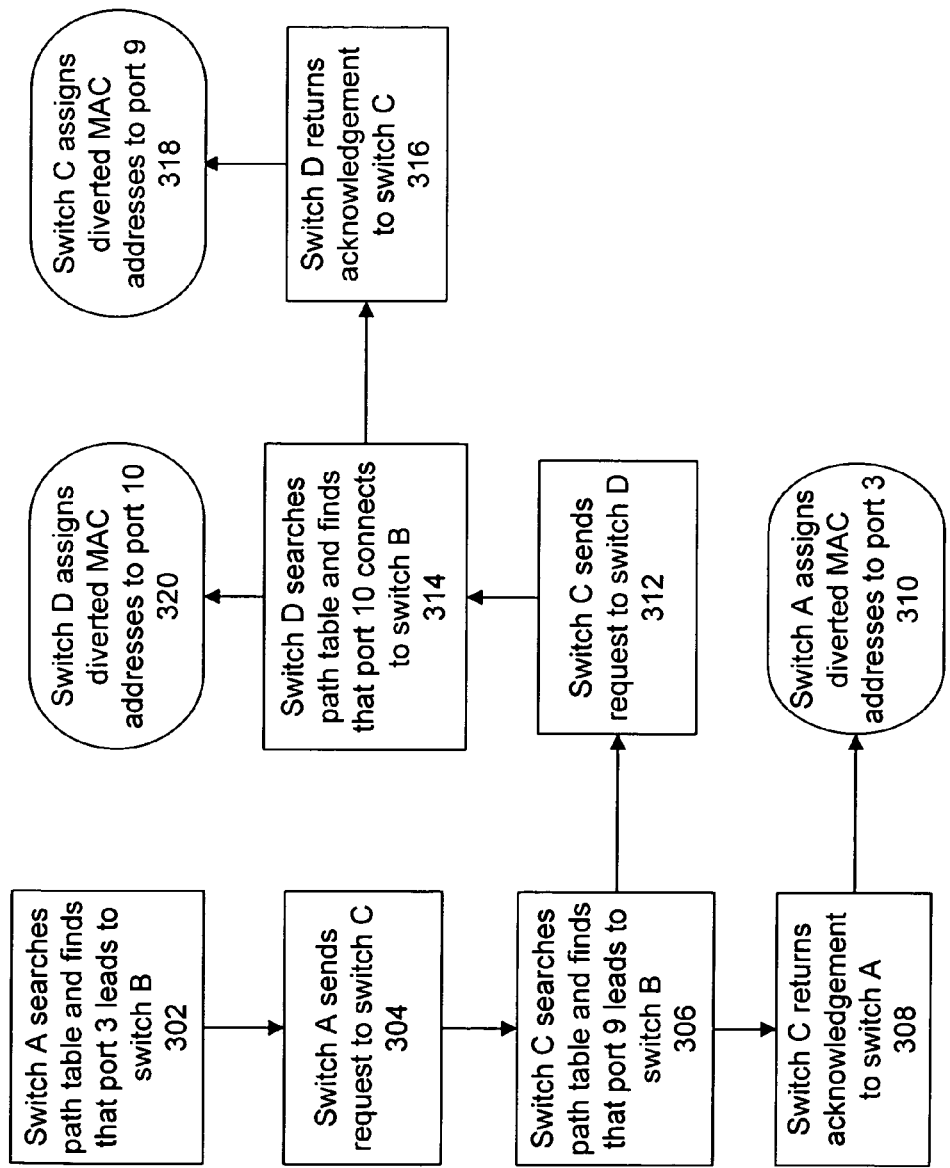
FIG. 3 is a flow chart depicting a procedure for building an alternate path in the prior method.

Building 108 the alternate path and assigning 110 the diverted addresses thereto involves a cumbersome procedure. Such a procedure 108/110 is now discussed in reference to FIG. 3 using the above example where switch A needs an alternate path to switch B. The procedure is as follows. Switch A searches 302 its path table and finds that its port 3 also leads to switch B. Switch A then sends 304 a request via port 3 to switch C asking whether switch C has a path to switch B. Switch C searches 306 its path table and finds that its port 9 leads to switch B. Hence, switch C returns 308 an acknowledgement via port 7 to switch A, and switch A assigns 310 the diverted MAC addresses (in this instance, MAC address Y) to port 3. In addition, since switch C does not have a direct path to switch B, switch C sends 312 a request via port 9 to switch D asking whether switch D has a path to switch B. Switch D searches 314 its path table and finds that its port 10 leads to switch B. Hence, switch D returns 316 an acknowledgement via port 12 to switch C, and switch C assigns 318 the diverted MAC addresses (in this instance, MAC address Y) to port 9. Finally, switch D is directly connected to switch B, and so switch B assigns 320 MAC address Y to its port 10.

Figure 6:
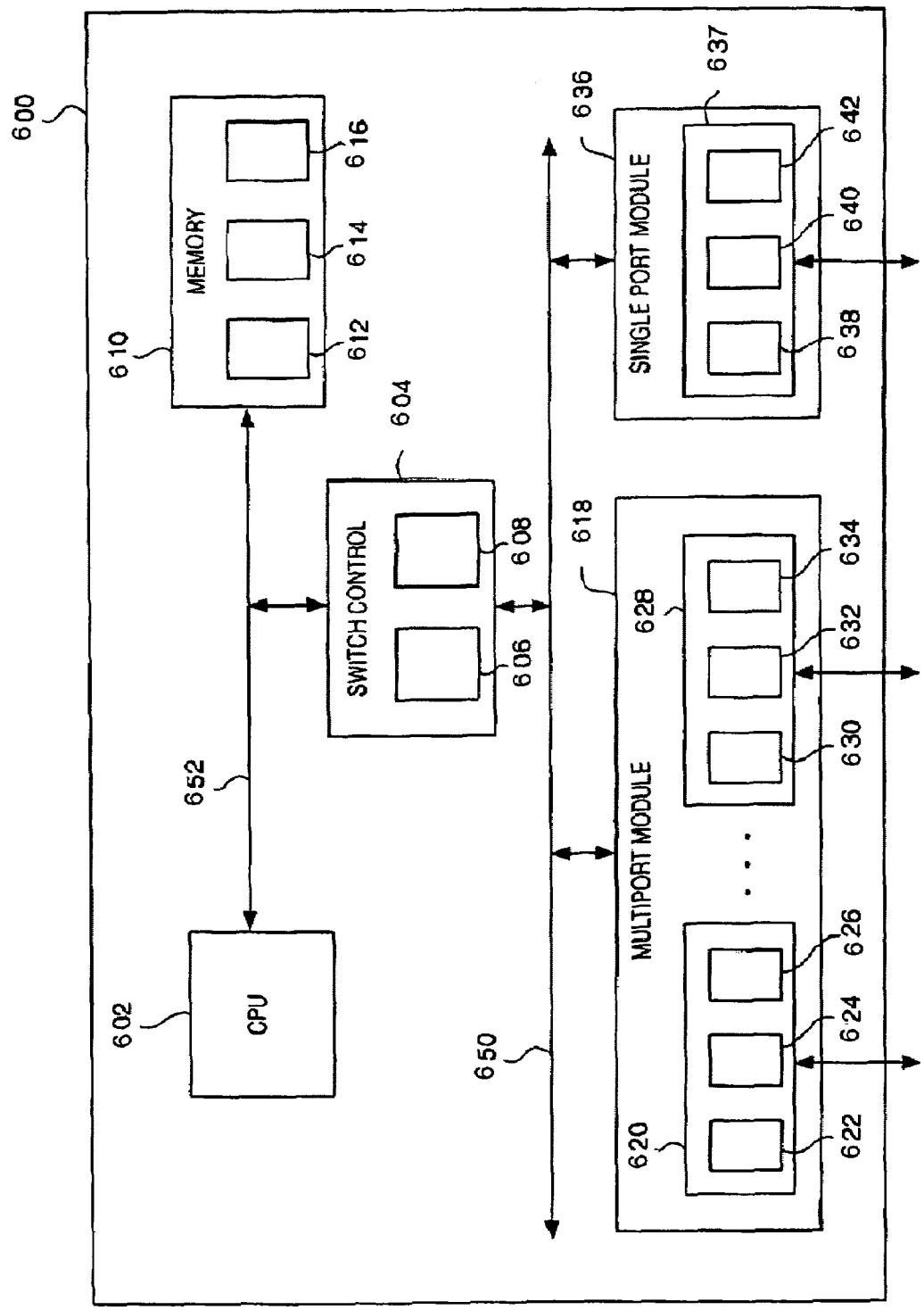
FIG. 6 is a schematic diagram of an example packet switch operable in accordance with an embodiment of the invention.

The above discussion in reference to FIG. 6 shows the tedious, error-prone, and slow nature of the procedure 108/110 to move a MAC address to a newly built path. As the above discussion indicates, one disadvantageous aspect relates to the moving of MAC addresses across several switches. When MAC addresses are moved, the initiator switch communicates with its neighbor switches in order to find an alternate path. If the neighbor switch is not directly connected to the destination switch, then the neighbor switch also needs to search for a path to the destination switch.

B. Switching Mesh and Path Tagging

Figure 4:
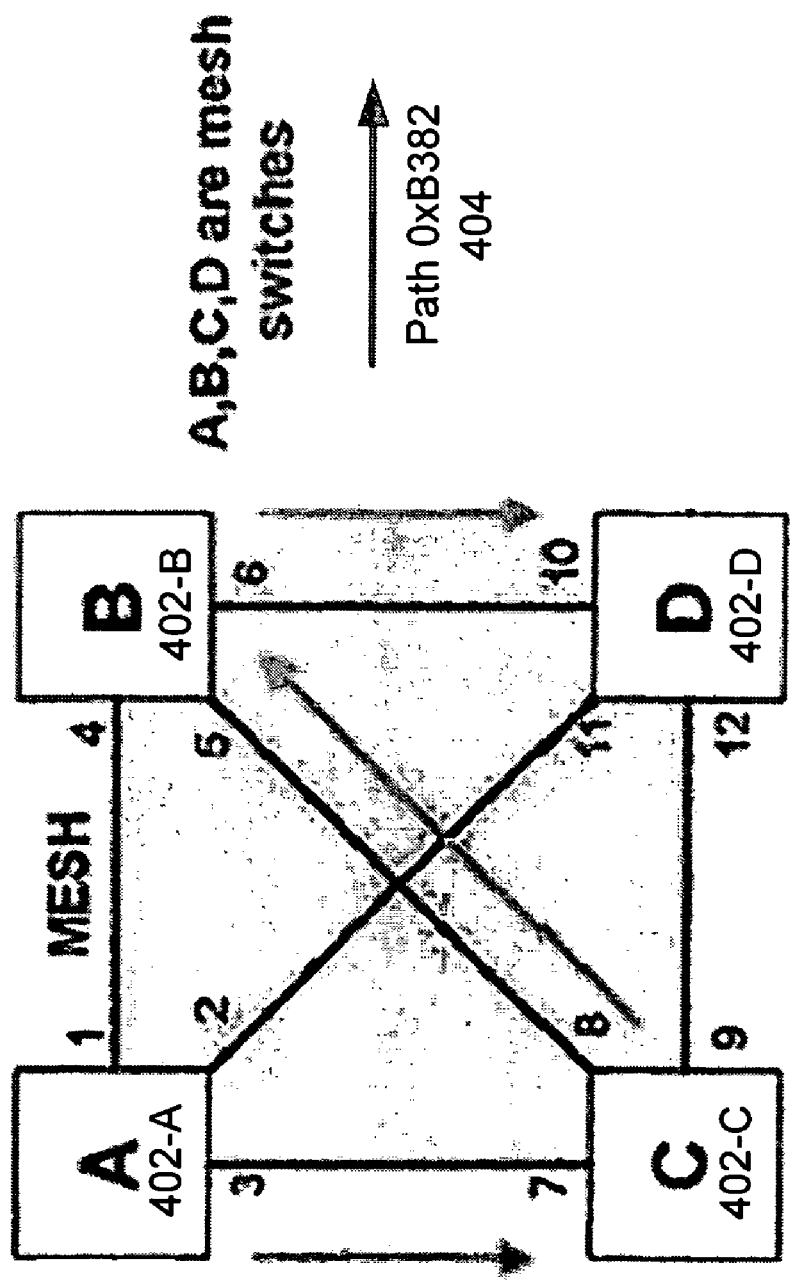
FIG. 4 is a schematic diagram depicting an exemplary switching mesh in accordance with an embodiment of the invention.

FIG. 4 is a schematic diagram depicting a switching mesh in accordance with an embodiment of the invention. One example path 404 is shown in FIG. 4. This path 404, designated in this instance as path 0xB382, travels as follows: exits port 3 of switch A 402-A; enters port 7 of switch C 402-C; exits port 8 of switch C 402-C; enters port 5 of switch B 402-B; exits port 6 of switch B 402-B; and enters port 10 of switch D 402-D.

In accordance with an embodiment of the invention, mesh tagging is utilized to advantageously identify paths within the mesh from a source switch to a destination switch. In one implementation, each source/destination pair may be configured with up to fifteen different paths. This is because four bits are used for the path identifier in a path tag and the zero value is considered invalid in this specific implementation. One example of such a path tag is described further below in relation to FIG. 5. Other embodiments may provide a different number of broadcast paths per switch by using a different number of bits for the path identifier. For example, if the path identifier has six bits, then each source/destination pair may be configured with sixty-three different paths.

Figure 5:
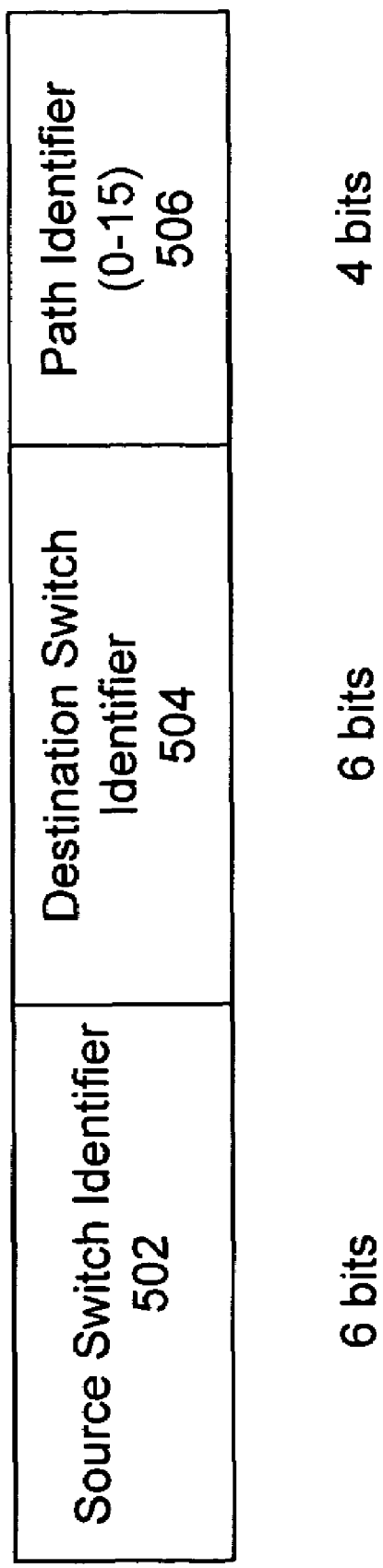
FIG. 5 is a diagram of a path tag in accordance with an embodiment of the invention.

FIG. 5 is a diagram of a path tag in accordance with an embodiment of the invention. The path tag includes a source switch identifier 502, a destination switch identifier 504, and a path identifier 506. The source switch identifier may also be called an owner switch identifier. In this embodiment, the path tag is sixteen bits in length. In particular, the source switch identifier 502 is six bits long, the destination switch identifier 504 is six bits long, and the path identifier 506 is four bits long. In this implementation, with the switch identifiers being six bits long, sixty-three different switches in the mesh may be distinguished and identified. (The value zero for the switch id being considered an invalid value in this implementation.) With the path identifier being four bits long, fifteen different paths may be identified per source/destination pair. (The value zero for the path id again being considered invalid in this implementation.) Other embodiments may have other lengths for these fields, resulting in different numbers of identifiable switches and paths.

Consider, for example, the mesh depicted in FIG. 4. Path tags of the format depicted in FIG. 5 may be used to identify different paths, for instance, from switch A to switch D. Given that source and destination, each path tag would include an identifier corresponding to switch A in the source switch identifier field 502 and an identifier corresponding to switch D in the destination switch identifier field 504. Distinctive path identifiers, one per path between A and D, would be included in the path identifier field 506.

For instance, a first path may go directly from A to D by exiting port 2 of switch A and entering port 11 of switch D. A second path may travel from A to D via switch C by exiting port 3 on switch A, entering port 7 of switch C, exiting port 9 of switch C, and entering port 12 of switch D. And so on for other possible paths. Each path is associated with a unique path identifier.

Consider the case where switch D learns a new MAC address and informs the rest of the mesh of the new MAC address associated with switch D. Switch A can then assign to that MAC address a path tag corresponding to one of the aforementioned paths from A to D (for example, path tag 0xB382 discussed above). Subsequently, every packet destined for that MAC address that enters switch A may be forwarded through the mesh based on that assigned path tag.

C. Example Packet Switch

FIG. 6 is a schematic diagram of an example packet switch 600 operable in accordance with an embodiment of the invention. The specific configuration of packet switches used will vary depending on the specific implementation.

A central processing unit (CPU) 602 performs overall configuration and control of the switch 600 operation. The CPU 602 operates in cooperation with switch control 604, an application specific integrated circuit (ASIC) designed to assist CPU 602 in performing packet switching at high speeds required by modern networks.

The switch control 604 controls the "forwarding" of received packets to appropriate locations within the switch for further processing and/or for transmission out another switch port. Inbound and outbound high speed FIFOs (606 and 608, respectively) are included with the switch control 604 for exchanging data over switch bus 652 with port modules. In accordance with an embodiment of the invention, the switch control ASIC 604 is configured to insert, remove, and analyze a path tag within a fixed location in a packet.

Memory 610 includes a high and low priority inbound queue (612 and 614, respectively) and outbound queue 616. High priority inbound queue 612 is used to hold received switch control packets awaiting processing by CPU 602 while low priority inbound queue 614 holds other packets awaiting processing by CPU 602. Outbound queue 616 holds packets awaiting transmission to switch bus 620 via switch control 604 through its outbound FIFO 608. CPU 602, switch control 604 and memory 610 exchange information over processor bus 652 largely independent of activity on switch bus 620.

The ports of the switch may be embodied as plug-in modules that connect to switch bus 620. Each such module may be, for example, a multi-port module 618 having a plurality of ports in a single module or may be a single port module 636. A multi-port module provides an aggregate packet switch performance capable of handling a number of slower individual ports. For example, in one embodiment, both the single port module 636 and the multi-port module 618 may be configured to provide, for example, approximately 1 Gbit per second packet switching performance. The single port module 636 therefore can process packet switching on a single port at speeds up to 1 Gbit per second. The multi-port module 618 provides similar aggregate performance but distributes the bandwidth over, preferably, eight ports each operating at speeds, for example, of up to 100 Mbit per second.

Each port includes high speed FIFOs for exchanging data over its respective port. Specifically, each port, 620, 628, and 637, preferably includes an inbound FIFO 622, 630, and 638, respectively for receiving packets from the network medium connected to the port. Further, each port 620, 628, and 637, preferably includes a high priority outbound FIFO 624, 632, and 610, respectively, and a low priority outbound FIFO 626, 634, and 642, respectively. The low priority outbound FIFOs are used to queue data associated with transmission of normal packets while the high priority outbound FIFO is used to queue data associated with transmission of control packets. Each module (618 and 636) includes circuits (not specifically shown) to connect its port FIFOs to the switch bus 620.

As packets are received from a port, the packet data is applied to the switch bus 620 in such a manner as to permit monitoring of the packet data by switch control 604. In general, switch control 604 manages access to switch bus 620 by all port modules (i.e., 618 and 636). All port modules "listen" to packets as they are received and applied by a receiving port module to switch bus 620. If the packet is to be forwarded to another port, switch control 604 applies a trailer message to switch bus 620 following the end of the packet to identify which port should accept the received packet for forwarding to its associated network link.

D. Over-Subscribed Mesh Port Recovery with Re-tagging

Figure 7:
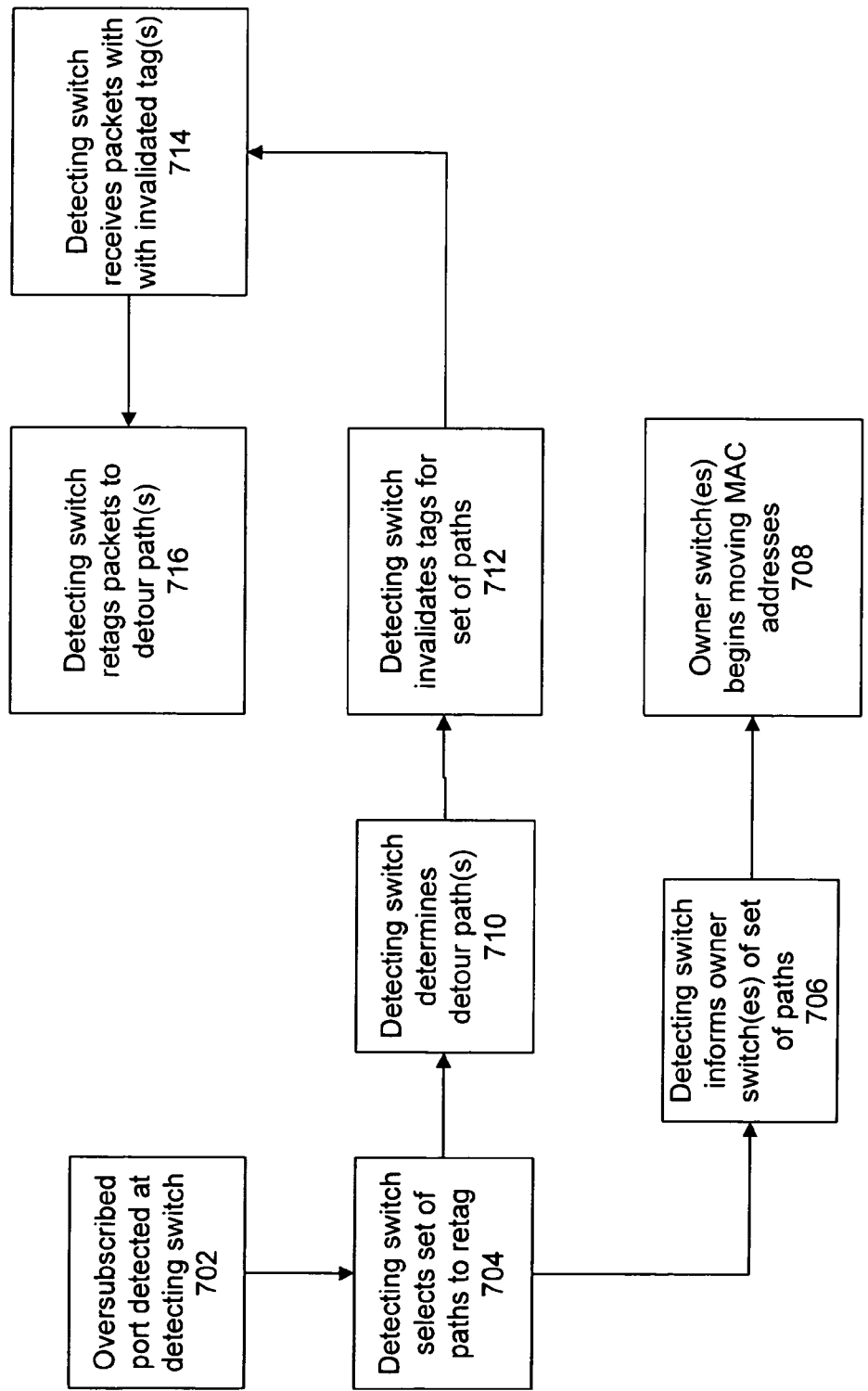
FIG. 7 is a flow chart depicting a method of oversubscribed port recovery in accordance with an embodiment of the invention.

FIG. 7 is a flow chart depicting a method of handling oversubscribed mesh ports in accordance with an embodiment of the invention. This technique differs substantially from the prior technique. Advantageously, this technique avoids the need to search and build a new path for the MAC addresses being diverted to alleviate the oversubscribed port condition. Instead, the mesh switch that identifies the oversubscribed mesh port chooses a set of tags to be retagged in order to stop or at least reduce the amount of packet loss occurring from the oversubscribed condition.

As described above, by using mesh tagging (i.e. tags identifying different paths through the mesh), each switch may maintain a set of multiple paths to each of the other switches in the mesh. For example, in one implementation described above, each mesh switch may maintain a set of up to 16 identified paths to each of the other mesh switches.

Figure 8A:
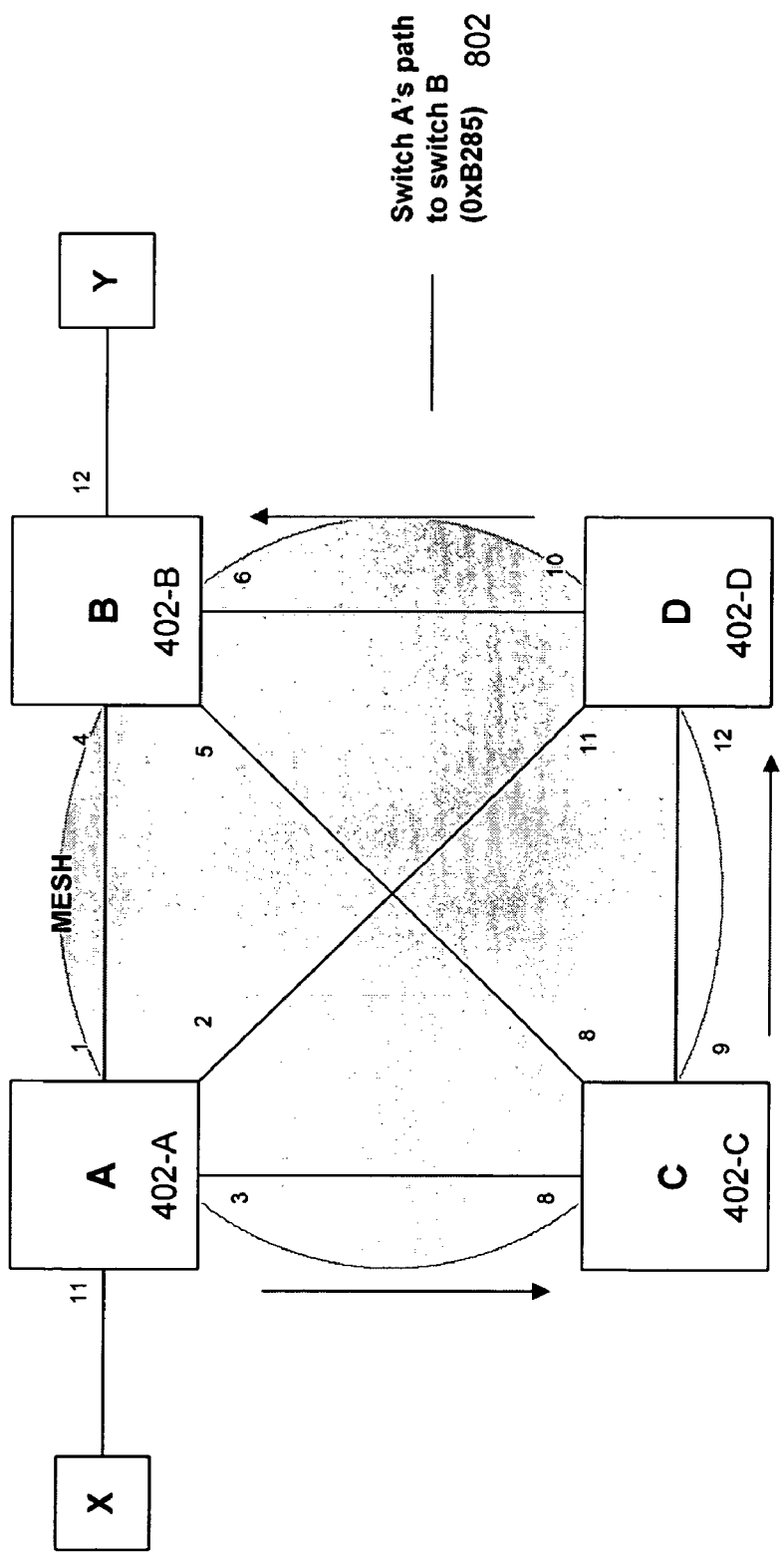
FIGS. 8A and 8B depict an exemplary switching mesh used to discuss the method of oversubscribed port recovery in accordance with an embodiment of the invention.
Figure 8B:
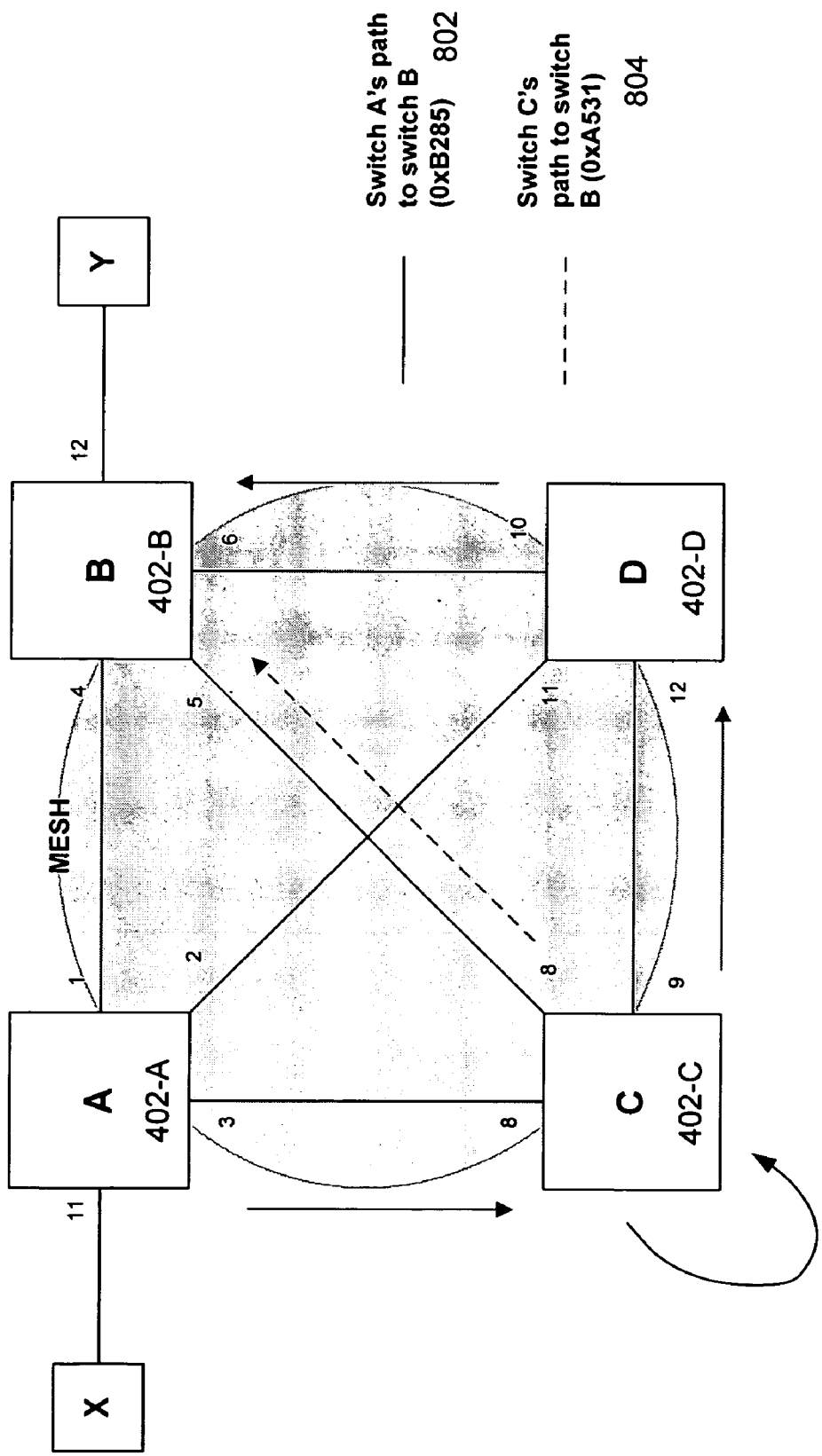

For purposes of illustration, consider the switching mesh and tagged paths depicted in FIGS. 8A and 8B. Let us say that source host X is communicating with destination host Y. The packets from host X enter the switching mesh on non-mesh port 11 of switch A 402-A. Switch A looks up host Y's MAC address in its hardware table and finds that path tag 0xB285 is associated with host Y. Switch A inserts the path tag 0xB285 into the packet and looks at the hardware table to see that port 3 is the exit port associated with that tag. As shown in FIG. 8A, the path 802 associated with tag 0xB285 traverses the switching mesh from switch A 402-A (exiting mesh port 3), to switch C 402-C (exiting mesh port 9), to switch D 402-D (exiting mesh port 10), and finally to switch B 402-B. A mesh port is a port to a link going between two mesh switches. When switch B (the destination switch) receives the tagged packet, switch B checks its hardware table and determines that this tag 0xB285 terminates on itself (i.e. terminates at switch B). Hence, switch B strips out the path tag from the packet and forwards the packet (without path tag) on the appropriate non-mesh port (port 12, in this instance).

Switches C 402-C and D 402-D are intermediate switches along that original path 802 to switch B 402-B (the destination switch). The following discussion considers an example wherein switch C 402-C has the oversubscribed mesh port (port 9 of switch C).

When switch C detects 702 that its mesh port 9 is oversubscribed (for example, due to port 9 dropping packets), then switch C 402-C selects 704 a set of paths from amongst the paths going from switch A (the owner switch) to switch B (the destination switch). This set of paths includes those paths to be retagged with tags for paths originating from switch C (the detecting switch) and destined for switch B (the destination switch). In this instance, consider that switch C 402-C selects 704 the path with tag 0xB285 802 to be retagged. Switch C (the detecting switch) then informs 706 switch A (the owner switch) of the set of tags that is going to be retagged.

Switch A (the owner switch) may then begin moving 708 some (or all) of MAC addresses associated with the path(s) that are going to be retagged. As discussed above, moving MAC addresses is a relatively slow and cumbersome process.

Meanwhile, in order to avoid or substantially reduce packet loss during the moving of MAC addresses by switch A, switch C determines 710 a detour path 804 (or detour paths) with associated path tag(s). For example, the detour path 804 may correspond to the direct path from switch C (port 8) to switch B (port 5) with path tag 0xA531, as shown in FIG. 8B.

Switch C (the detecting switch) invalidates 712 tags for the set of paths to be retagged. In our example, the tag 0xB285 802 is invalidated. When switch C (the detecting switch) receives 714 packets with the invalidated path tag(s), switch C retags 716 these packets with a tag for a detour path (or with tags for more than one detour path).

Note that while the specific instance discussed above involves retagging packets from a single owner switch, packets from more than one owner switch may be retagged to the detour path(s).

Further note that, in accordance with a preferred embodiment, a two-mode operation may be implemented. When an oversubscribed port is detected 702, a determination is first made as to the number of tags associated with that port.

In a first mode, if the number of tags is large, then some of the tags are changed (retagged) by the detecting switch to a new path tag, and the owner switch(es) of the changed tags are informed that their tag is no longer being used.

In a second mode, if there are not that many tags associated with the oversubscribed port, then the detecting switch does not do the retagging. Instead, the detecting switch chooses a tag or set of tags and informs the owner switches of the oversubscription condition. When the owner switches receive this notification, they reassign one or more of the MAC addresses associated with those tags to new, less costly path tags.

In addition to the steps shown in FIG. 7, the detecting switch may also be configured to send a cost update message to other switches in the mesh that initiate tags containing the oversubscribed port. The cost update message may contain the delta cost (i.e. the change in cost) for the tag. The delta cost may be calculated from the difference between the current cost added by the switch and the previous cost added by the switch. When a switch receives this delta cost relating to a tag that it initiates, the receiving switch adds the delta cost to the current cost for the tag in order to update it. In this manner, a port that is oversubscribed becomes known as more costly in an advantageously immediate fashion rather than having to wait for a periodic recalculation of such costs. The more immediate updating of the tag costs allows for more appropriate load balancing to be performed. (Note that, in one implementation, the cost may be a function of link speed, outbound queue depth, inbound queue depth, and number of dropped packets. Since measurements of these factors may be performed at polled intervals, the calculated cost will typically be smoothed using an algorithm that gives more weight to the current measurement.)

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A packet switch apparatus with oversubscribed port handling capability for use in a switching mesh, the apparatus including:
    a plurality of ports; and
    a switch controller coupled to the plurality of ports,
        wherein the switch controller is configured to (a) detect an oversubscribed port, (b) select a set of paths exiting at the oversubscribed port for retagging, (c) invalidate tags for the set of paths, (d) receive packets with the invalidated tags, and (e) retag the received packets with a tag associated with a detour path;
        wherein the invalidated tags and the tags associated with the detour comprise paths assigned to respective ones of the packets and which paths individually comprise a path between an originating source switch and an end destination switch of the respective packet and which includes a plurality of different switches intermediate the originating source and end destination switches; and
        wherein the invalidated tags and the tags associated with the detour individually comprise a source switch identifier which identifies the originating source switch of the respective packet of the individual tag and a destination switch identifier which identifies the end destination switch of the respective packet of the individual tag.

2. The apparatus of claim 1 wherein the switch controller is further configured to determine the detour path from the detecting switch to the end destination switch for the set of paths.

3. The apparatus of claim 1 wherein the switch controller is further configured to inform an owner switch of the set of paths that the paths are to be retagged by the detecting switch.

4. The apparatus of claim 1, wherein the detour path defines an order of the switches of the detour path to communicate the packets after the retagging and which is different than orders of the switches of respective ones of the selected set of paths to communicate the packets.

5. The apparatus of claim 1, wherein the tags associated with the detour remain associated with the received packets after the retagging and during subsequent communications of the received packets to the end destination switch by the plural switches of the detour path.

6. The apparatus of claim 1, wherein tags of other packets, received by the packet switch apparatus during the retagging of the received packets with the tag associated with the detour path, are not retagged by the switch controller.

7. A method of handling oversubscribed ports between switches, the method comprising:
    detecting an oversubscribed port at a detecting switch;
    selecting a set of paths exiting at the oversubscribed port for retagging;
    invalidating tags for the set of paths;
    receiving packets with the invalidated tags; and
    retagging the received packets with a tag associated with a detour path;
        wherein the invalidated tags and the tags associated with the detour comprise paths assigned to respective ones of the packets and which paths individually comprise a path between an originating source switch and an end destination switch of the respective packet and which includes a plurality of different switches intermediate the originating source and end destination switches, and
        wherein the invalidated tags and the tags associated with the detour individually comprise a source switch identifier which identifies the originating source switch of the respective packet of the individual tag and a destination switch identifier which identifies the end destination switch of the respective packet of the individual tag.

8. The method of claim 7 further comprising determining the detour path from the detecting switch to a destination switch for the set of paths.

9. The method of claim 7, further comprising informing an owner switch of the set of paths that the paths are to be retagged by the detecting switch.

10. The method of claim 9, wherein more than one owner switch is so informed.

11. The method of claim 9, further comprising the owner switch moving at least some MAC addresses associated with the set of paths.

12. The method of claim 11, wherein the owner switch moves all MAC addresses associated with the set of paths.

13. The method of claim 7, wherein the detecting switch is different from an owner switch of the set of paths.

14. The method of claim 7, wherein the detecting switch comprises a same switch as an owner switch of the set of paths.

15. The method of claim 7, wherein the set of paths includes at least one path.

16. The method of claim 7, wherein the switches are part of a switching mesh.

17. A switching mesh including a capability to handle oversubscribed ports between switches, comprising:
   a plurality of switches,
   wherein the plurality of switches in the mesh are individually configured to:
   detect an oversubscribed port,
   select a set of paths exiting at the oversubscribed port for retagging,
   invalidate tags for the set of paths,
   receive packets with the invalidated tags, and
   wherein the invalidated tags and the tags associated with the detour comprise paths assigned to respective ones of the packets and which paths individually comprise a path between an originating source switch and an end destination switch of the respective packet and which includes a plurality of different switches intermediate the originating source and end destination switches, and
   wherein the invalidated tags and the tags associated with the detour individually comprise a source switch identifier which identifies the originating source switch of the respective packet of the individual tag and a destination switch identifier which identifies the end destination switch of the respective packet of the individual tag.

18. The switching mesh of claim 17, wherein a switch detecting an oversubscribed port is configured to determine a number of path tags associated with the oversubscribed port and to operate in at least two modes depending on the number of associated path tags.

19. The switching mesh of claim 18, wherein if the number of associated path tags is larger than a threshold, then a first mode is used where some of the associated path tags are retagged by the detecting switch to a detour path tag, and the owner switch of those retagged paths are informed that those paths are no longer being used.

20. The switching mesh of claim 19, wherein if the number of associated path tags is smaller than a threshold, then a second mode is used without retagging by the detecting switch.

21. The switching mesh of claim 20, wherein in the second mode, a set of at least one path tag is chosen, and the owner switch of the chosen tags is informed of the oversubscribed port.

22. The switching mesh of claim 21, wherein an informed owner switch reassigns at least one MAC address associated with the chosen tag to another, less costly path tag.

* * * * *